(12) United States Patent
Baker et al.

(10) Patent No.: US 8,369,019 B2
(45) Date of Patent: Feb. 5, 2013

(54) WAVEGUIDES

(75) Inventors: Ian Andrew Baker, Ermington (GB); Vincent Andrei Handerek, Grays (GB)

(73) Assignee: BAE Systems plc, London (GB)

( * ) Notice: Subject to any disclaimer, the term of this patent is extended or adjusted under 35 U.S.C. 154(b) by 58 days.

(21) Appl. No.: 12/937,623

(22) PCT Filed: Mar. 25, 2009

(86) PCT No.: PCT/GB2009/050280
§ 371 (c)(1), (2), (4) Date: Oct. 13, 2010

(87) PCT Pub. No.: WO2009/127849
PCT Pub. Date: Oct. 22, 2009

(65) Prior Publication Data
US 2011/0026128 A1    Feb. 3, 2011

(30) Foreign Application Priority Data
Apr. 14, 2008  (EP) .................................... 08200016
Apr. 14, 2008  (GB) ................................... 0806722.5

(51) Int. Cl.
G02B 27/14 (2006.01)
(52) U.S. Cl. .................................................. 359/630
(58) Field of Classification Search ............. 359/630
See application file for complete search history.

(56) References Cited

U.S. PATENT DOCUMENTS
2004/0246391 A1  12/2004  Travis
2006/0228073 A1*  10/2006  Mukawa et al. .............. 385/31

FOREIGN PATENT DOCUMENTS

| EP | 0 962 794 A1 | 12/1999 |
|---|---|---|
| EP | 1 385 023 A1 | 1/2004 |
| JP | 9-189907 | 7/1997 |
| JP | 2007-11057 | 1/2007 |
| WO | WO 2006/025317 A1 | 3/2006 |
| WO | WO 2007/029032 A1 | 3/2007 |
| WO | WO 2007/029034 A1 | 3/2007 |

OTHER PUBLICATIONS

International Search Report dated Jul. 8, 2009.
Extended European Search Report dated Aug. 14, 2008.
UK Search Report dated Aug. 11, 2008.
International Preliminary Report on Patentability dated Apr. 27, 2010.

* cited by examiner

*Primary Examiner* — James Jones
(74) *Attorney, Agent, or Firm* — Scully, Scott, Murphy & Presser, PC

(57) ABSTRACT

A projection display (60) includes a first waveguide (64) incorporating a grating structure (74) and second waveguide (66) incorporating an exit grating (84). The first and second waveguides (64, 66) are arrange to expand an image in orthogonal directions. The second waveguide (66) includes a first layer (86) with a first predetermined refractive index and/or first predetermined thickness, a second layer (88) with a second predetermined refractive index and/or second predetermined thickness. The exit grating (84) is arranged to direct at least some impinging light out of the second waveguide(66) and to provide at least some beam splitting of light passing through the exit grating (84). The first and second layers (86, 88) are arranged to abut one another such that the exit grating (84) is therebetween. The first predetermined refractive index and second predetermined refractive index and/or first predetermined thickness and second predetermined thickness are arranged to vary the spatial periodicity of pupils of image bearing light radiated from the second waveguide (66).

21 Claims, 5 Drawing Sheets

WAVEGUIDES

This invention relates to a waveguide and a projection display for displaying an image to an observer, which is particularly, but not exclusively, suitable for use in a head up display, a helmet mounted display or head mounted display.

Referring to FIGS. 1 and 2, wherein like references have been used to indicate similar integers, prior art International patent application publication number WO2007/029032 teaches a projection display 10 for displaying an image to an observer 12 that uses waveguide techniques to generate a collimated display defining a large exit pupil at the point of the observer 12 and a large field of view, whilst using a small image-providing light source device. The projection display 10 uses a first plate-like waveguide 14 made of light transmissive material such as glass or plastic and a second plate-like waveguide 16 made from a light transmissive and light transparent material such as glass or plastic. The projection display 10 additional includes an image-providing light source device, not shown, located to inject image bearing light into the first plate-like waveguide 14 through a first face 18.

The image-providing light source device includes a micro-display arranged to provide information to be displayed to the observer 12. Additionally the image-providing light source device includes a collimating optical arrangement located between the micro-display and the first face 18 of the first plate-like waveguide 14. The collimating optical arrangement is operable to collimate light received from the micro-display and to inject the collimated image bearing light into the first plate-like waveguide 14 through the first face 18.

The collimated image bearing light produced by the collimating optical arrangement has a small exit pupil and is fed into the first plate-like waveguide 14, which performs the function of stretching the horizontal pupil of the final display. The output from the first plate-like waveguide 14 is fed into the second plate-like waveguide 16, which is arranged to stretch the vertical pupil of the final display and also to act as a combiner for the projection display 10 through which the observer 12 views an outside world scene 20 along a line of sight 22 of the observer 12 through the second plate-like waveguide 16 with information to be displayed to the observer 12 overlaid on the outside world scene 20. In this manner, the image to be displayed to the observer 12 looking through the second plate-like waveguide 16 defines a large exit pupil and a large field of view whilst using a small image generating light source.

Image bearing light injected into first plate-like waveguide 14, via first face 18 is incident on a transmission grating 24 arranged internally within the first plate-like waveguide 14 and substantially parallel with the first face 18. Light impinging on the transmission grating 24 diffracts therefrom such that the incidence angle of the light on the internal surfaces of the first plate-like waveguide 14 is greater than the critical angle for the material from which the first plate-like waveguide 14 is made. The image bearing light is constrained within the first plate-like waveguide 14 to propagate along the first plate-like waveguide 14 reflecting from each internal surface in turn to follow a predefined light path 26. Thus, the relative field angles of the light incident on the first plate-like waveguide 14 at the first face 18 are preserved within the first plate-like waveguide 14 and the information required to regenerate the original image is preserved.

The transmission grating 24 also serves to radiate the image bearing light out of the first plate-like waveguide 14. The transmission grating 24 is a low efficiency grating which diffracts a small amount of light out of the first plate-like waveguide 14 on each interaction with incident image bearing light.

The second plate-like waveguide 16 is located with a first face 28 parallel with a second face 30 of the first plate-like waveguide 14 and is arranged to receive the image bearing light exiting the second face 30 of the first plate-like waveguide 14. The second face 30 is parallel to the first face 18 of the first plate-like waveguide 14. The first face 28 of the second plate-like waveguide 16 is located adjacent and close to the second face 30 of the first plate-like waveguide 14. The second plate-like waveguide 16 includes a coupling grating 32 located therein arranged substantially parallel to the first face 28 of the second plate-like waveguide 16 and the coupling grating 32 is operable to diffract each impinging ray of image bearing light received from the transmission grating 24 of the first plate-like waveguide 14 at an angle that is larger than the critical angle for the material from which the second plate-like waveguide 16 is made. Accordingly, received image bearing light will propagate inside the second plate-like waveguide 16 to follow the predefined light path 26. The image bearing light continues along the light path 26 to an exit grating 34 arranged on or within the second plate-like waveguide 16, which is arranged to diffract the received image bearing light out of the second plate-like waveguide 16 towards the observer 12.

The coupling grating 32 is arranged such that its diffractive power is rotated through 90 degrees to that of the diffractive power of the parallel transmission grating 24 to rotate incident image bearing light towards the exit grating 34.

The exit grating 34 is a low efficiency grating, such that as image bearing light propagates along the light path 26 within the second plate-like waveguide 16, each interaction with the exit grating 34 causes a small proportion of the image bearing light to be diffracted out of the second plate-like waveguide 16. Image bearing light which is not diffracted out of the second plate-like waveguide 16 continues to propagate within the second plate-like waveguide 16. Accordingly, a large number of parallel rays of image bearing light exit the second plate-like waveguide 16 through the exit grating 34 towards the observer 12, which originated at discrete points on the micro-display forming the image generating light source device.

However, in such a prior art projection display 10, at particular viewing angles of the observer 12 relative to the second plate-like waveguide 16, individual pupils of image bearing light exiting the second plate-like waveguide 16 do not overlap and the phenomenon of pupil banding can be perceived by the observer 12. Pupil banding is the modulation of the intensity of the image bearing light, as perceived by the observer 12, as the line of sight 22 of the observer 12 through the second plate-like waveguide 16 alters relative to the image presented to the observer 12.

Referring to FIG. 3, a second plate-like waveguide 40 includes an exit grating 42 arranged such that impinging image bearing light following a light pathway 44 is either diffracted out of the second plate-like waveguide 40 as a pupil of image bearing light 46a to 46n for viewing by an observer, not illustrated, or image bearing light passes through the exit grating 42 and is reflected by internal surface 48 of the second plate-like waveguide 40 so as to propagate further through the second plate-like waveguide 40 and hence impinge on the exit grating 42 again.

It should be noted that the individual pupils of image bearing light 46a to 46n exiting the second plate-like waveguide 40 as illustrated are the centres of the output pupils and are regularly spaced. Referring to FIG. 4, wherein like references have been used to indicate similar integers to those described with reference to FIG. 3, the individual pupils of image bearing light 46a to 46n can be more clearly seen. Since the individual pupils of image bearing light 46a to 46n are regularly spaced and do not overlap, if the eye of the observer moves across the second plate-like waveguide 40 or the angular direction from which the observer looks through the second plate-like waveguide 40 changes, the intensity of the image bearing light from each pupil of image bearing light 46a to 46n will appear to modulate. This results in the phenomenon of pupil banding that can be perceived by the observer.

Referring to FIG. 5, wherein like referenced have been used to indicate similar integers to those described with reference to FIGS. 3 and 4, the individual pupils of image bearing light 46a to 46n can be seen on the second plate-like waveguide 40 as viewed by an observer. Again, it will be seen that the individual pupils of image bearing light 46a to 46n are regularly spaced providing regions of more intense illumination and that the individual pupils of image bearing light 46a to 46n do not overlap.

According to a first aspect of the invention a waveguide, includes a first layer of material with a first predetermined refractive index and/or first predetermined thickness, a second layer of material with a second predetermined refractive index and/or second predetermined thickness, a grating element arranged on either the first or the second layer of material and arranged to direct at least some impinging image bearing light out of the waveguide and to provide at least some beam splitting of image bearing light passing through the grating element, the first and second layers of material are arranged to abut one another such that the grating element is arranged between the first and the second layers of material, and wherein the first predetermined refractive index and second predetermined refractive index and/or the first predetermined and second predetermined thickness are arranged to vary the spatial periodicity of pupils of image bearing light radiated from the waveguide.

In this manner, the pupils of image bearing light are altered such that the pupils of image bearing light exiting the waveguide tend to mix together or overlap with one another and such mixing or overlapping of pupils results in a mitigation of the pupil banding perceived by an observer.

A beam splitter element may also be arranged to split impinging image bearing light and may be arranged to direct such image bearing light within the waveguide.

The first and second layers of material may be formed from two different materials with different refractive indices. Alternatively, the first and second layers of material may be formed from the same material, one layer of material arranged to have a different thickness to the other layer of material. For example, a non-integer ratio of the thickness between the first and second layers of material.

According to another aspect of the invention a waveguide, includes a first region of material with a first predetermined refractive index and/or first predetermined thickness, a second region of material with a second predetermined refractive index and/or second predetermine thickness, a grating element arranged along the boundary of the first and second regions and arranged to direct at least some impinging image bearing light out of the waveguide and to provide at least some beam splitting of image bearing light passing through the grating element, and wherein the first predetermined refractive index and second predetermined refractive index and/or first predetermined thickness and second predetermined thickness are arranged to vary the spatial periodicity of pupils of image bearing light radiated from the waveguide Again, in this manner, the pupils of image bearing light are altered such that the pupils of image bearing light exiting the waveguide tend to mix together or overlap with one another and such mixing or overlapping of pupils results in a mitigation of the pupil banding perceived by an observer.

The first and second regions of material may be arranged to have different refractive indices and/or different thickness by application of at least one of the following processes: ion injection or diffusion or implantation.

A beam splitter element may also be arranged to split impinging image bearing light and may be arranged to direct such image bearing light within the waveguide.

According to another aspect of the invention a projection display, for displaying an image to an observer, includes a first waveguide element arranged to be light transmissive, an image-providing light source device arranged to generate an image and to inject image bearing light into the first waveguide element, a transmission grating associated with the first waveguide element arranged to direct the image bearing light internally along the first waveguide element and through which the image bearing light is outputted from the first waveguide element, a second waveguide element arranged to be light transmissive and transparent that includes a coupling grating arranged to receive the image bearing light from the first waveguide element and to direct the image bearing light along the second waveguide element, the second waveguide element further includes an exit grating arranged to diffract received image bearing light out of the second waveguide element towards an observer, and wherein the second waveguide element includes a first layer of material with a first predetermined refractive index and/or first predetermined thickness, a second layer of material with a second predetermined refractive index and/or second predetermined thickness, the exit grating is arranged on either the first or the second layer of material and arranged to direct at least some impinging image bearing light out of the second waveguide element and to provide at least some beam splitting of image bearing light passing through the exit grating, the first and second layers of material are arranged to abut one another such that the exit grating is arranged between the first and the second layers of material, and wherein the first predetermined refractive index and second predetermined refractive index and/or first predetermined thickness and second predetermined thickness are arranged to vary the spatial periodicity of pupils of image bearing light radiated from the second waveguide element.

The first waveguide element may include a first layer of material with a first predetermined refractive index and/or first predetermined thickness, a second layer of material with a second predetermined refractive index and/or second predetermined thickness, the transmission grating may be arranged on either the first or the second layer of material and arranged to direct at least some impinging image bearing light out of the first waveguide element and to provide at least some beam splitting of image bearing light passing through the transmission grating, the first and second layers of material may be arranged to abut one another such that the transmission grating is arranged between the first and the second layers of material, and wherein the first predetermined refractive index and second predetermined refractive index and/or first predetermined thickness and second predetermined thickness may be arranged to vary the spatial periodicity of pupils of image bearing light radiated from the first waveguide element.

According to another aspect of the invention a projection display, for displaying an image to an observer, includes a first waveguide element arranged to be light transmissive, an image-providing light source device arranged to generate an image and to inject image bearing light into the first waveguide element, a transmission grating associated with the first waveguide element arranged to direct the image bearing light internally along the first waveguide element and through which the image bearing light is outputted from the first waveguide element, a second waveguide element arranged to be light transmissive and transparent that includes a coupling grating arranged to receive the image bearing light from the first waveguide element and to direct the image bearing light along the second waveguide element, the second waveguide element further includes an exit grating arranged to diffract received image bearing light out of the second waveguide element towards an observer, and wherein the second waveguide element includes a first region of material with a first predetermined refractive index and/or first predetermined thickness, a second region of material with a second predetermined refractive index and/or second predetermined thickness, the exit grating is arranged along the boundary of the first and second regions and arranged to direct at least some impinging image bearing light out of the second waveguide element and to provide at least some beam splitting of image bearing light passing through the exit grating and wherein the first predetermined refractive index and second predetermined refractive index and/or first predetermined thickness and second predetermined thickness are arranged to vary the spatial periodicity of pupils of image bearing light radiated from the second waveguide element.

The first waveguide element may include a first region of material with a first predetermined refractive index and/or first predetermined thickness, a second region of material with a second predetermined refractive index and/or second predetermined thickness, the transmission grating may be arranged along the boundary of the first and second regions and arranged to direct at least some impinging image bearing light out of the first waveguide element and to provide at least some beam splitting of image bearing light passing through the transmission grating and wherein the first predetermined refractive index and second predetermined refractive index and/or first predetermined thickness and second predetermined thickness may be arranged to vary the spatial periodicity of pupils of image bearing light radiated from the first waveguide element.

A collimating lens arrangement may be arranged between the image-providing light source device and the first waveguide element and the collimating lens arrangement may be arranged to collimate image bearing light generated by the image-providing light source.

The transmission grating may be arranged such that incident inputted image bearing light is diffracted therefrom with the incidence angle of the diffracted light at internal surfaces of the first waveguide element arranged to be greater that the critical angle for the material from which the first waveguide element is made.

The transmission grating may be a low efficiency grating.

The coupling grating may be arranged such that incident image bearing light is diffracted therefrom with the incident angle of the diffracted light at internal surfaces of the second waveguide element arranged to be greater than the critical angle for the material from which the second waveguide element is made.

The diffractive power of the coupling grating may be rotated through 90° with respect to the diffractive power of the transmission grating.

The second waveguide element may include a narrow band selective reflection coating provided on a surface of the second waveguide element parallely spaced from the exit grating, which reflective coating may be arranged to reflect light passing through the exit grating towards the narrow band selective reflection coating back to the exit grating.

The first waveguide element may be curved. The second waveguide element may be curved.

The injection of image bearing light may be via reflective or transmissive or refractive means.

The first waveguide element may be plate-like, the second waveguide element may be plate-like and the first and second waveguide elements may be arranged substantially co-planar to one another.

Alternatively, the first waveguide element and the second waveguide element may be arranged substantially in the same plane. The first waveguide element and the second waveguide element may be formed within a single piece of material.

The waveguide may form part of a Head Up Display, or Helmet Mounted Display, or Head Mounted Display.

The projection display may form part of a Head Up Display, or Helmet Mounted Display, or Head Mounted Display.

The invention will now be described, by way of example only, with reference to the accompanying drawings, in which.

Figure 1:
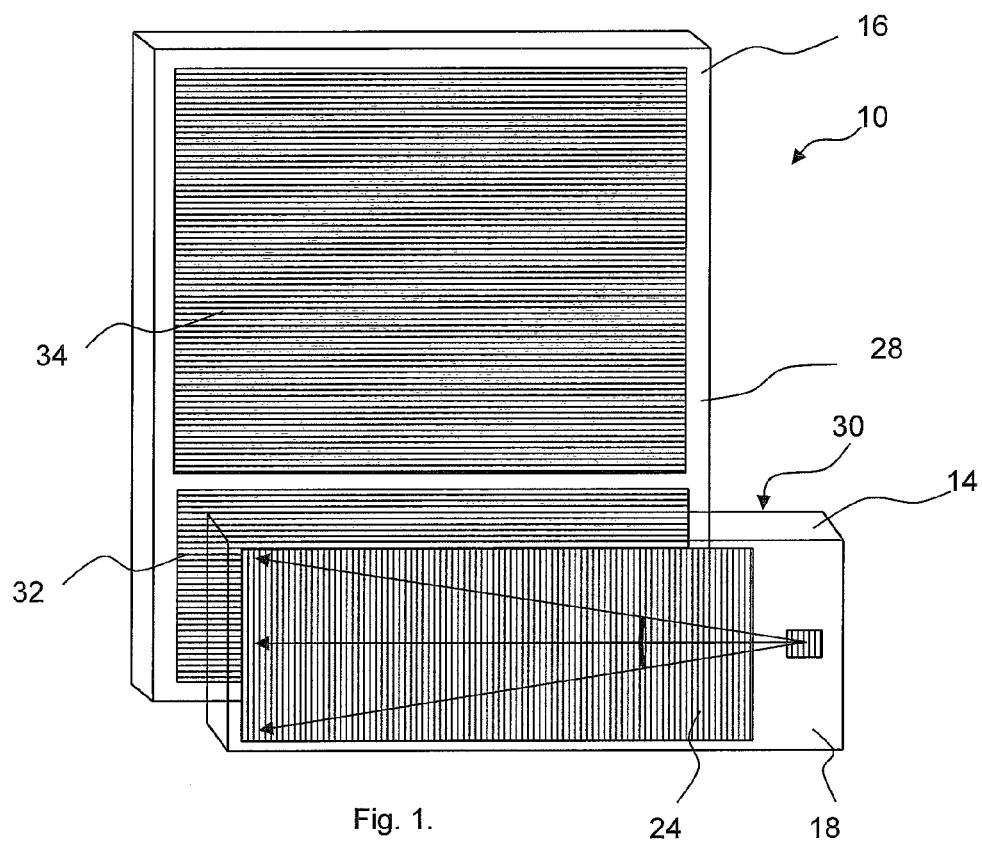
FIG. 1 illustrates, in perspective view, a prior art projection display including parallel waveguides.
Figure 2:
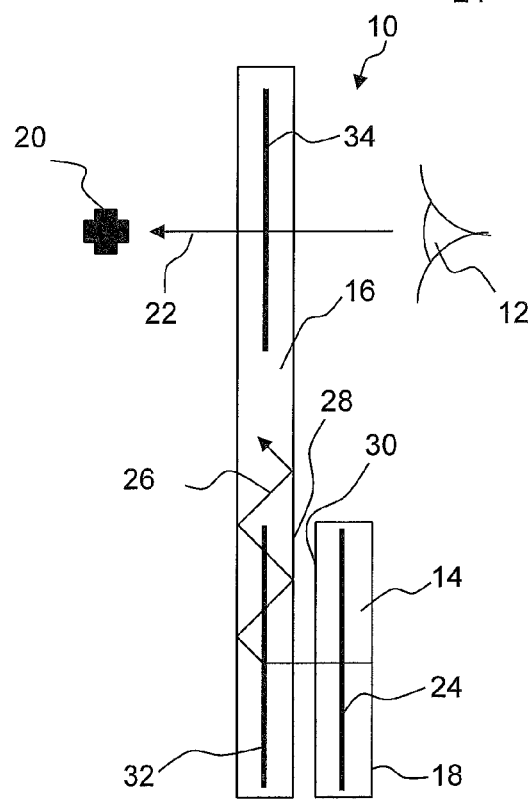
FIG. 2 illustrates, in elevation view, the prior art projection display of FIG. 1.
Figure 6:
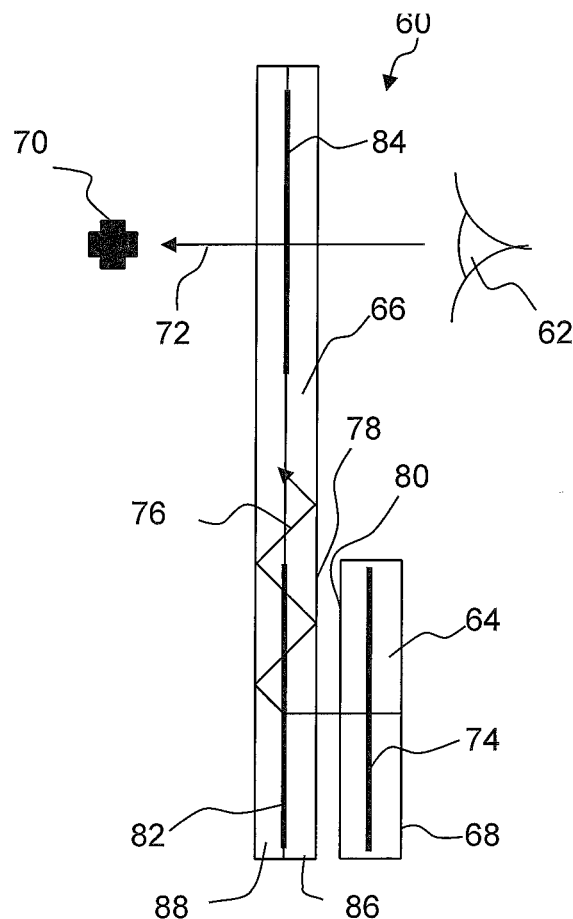
FIG. 6 illustrates, in elevation view, a projection display according to the present invention.
Figure 3:
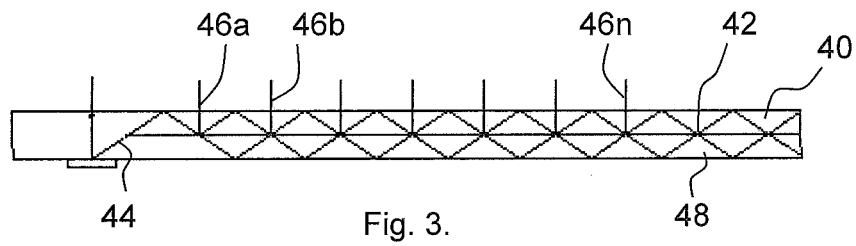
FIG. 3 illustrates, in elevation view; a prior art waveguide and propagation of image bearing light through the waveguide.

Referring to FIG. 6, there is illustrated a projection display 60 for displaying an image to an observer 62 that uses waveguide techniques to generate a collimated display defining a large exit pupil at the point of the observer 62 and a large field of view, whilst using a small image-providing light source device. The projection display 60 uses a first plate-like waveguide 64 made of light transmissive material such as glass or plastic and a second plate-like waveguide 66 made from a light transmissive and light transparent material such as glass or plastic. The projection display 60 additional includes an image-providing light source device, not shown, located to inject image bearing light into the first plate-like waveguide 64 through a first face 68.

The image-providing light source device includes a microdisplay arranged to provide information to be displayed to the observer 62. Additionally the image-providing light source device has an associated collimating optical arrangement located between the micro-display and the first face 68 of the first plate-like waveguide 64. The collimating optical arrangement is operable to collimate light received from the micro-display and to inject the collimated image bearing light into the first plate-like waveguide 64 through the first face 68.

The collimated image bearing light produced by the collimating optical arrangement has a small exit pupil and is injected into the first plate-like waveguide 64, which performs the function of stretching the horizontal pupil of the final display. The output from the first plate-like waveguide 64 is fed into the second plate-like waveguide 66, which is arranged to stretch the vertical pupil of the final display and also to act as a combiner for the projection display 60 through which the observer 62 views an outside world scene 70 along a line of sight 72 of the observer 62 through the second plate-like waveguide 16 with information to be displayed to the observer 62 overlaid on the outside world scene 70. In this manner, the image to be displayed to the observer 62 looking through the second plate-like waveguide 66 defines a large exit pupil and a large field of view whilst using a small image generating light source.

Image bearing light injected into first plate-like waveguide 64, via first face 68 is incident on a transmission grating 74 arranged internally within the first plate-like waveguide 64 and substantially parallel with the first face 68. Light impinging on the transmission grating 74 diffracts therefrom such that the incidence angle of the light on the internal surfaces of the first plate-like waveguide 64 is greater than the critical angle for the material from which the first plate-like waveguide 64 is made. The image bearing light is constrained within the first plate-like waveguide 64 to propagate along the first plate-like waveguide 64 reflecting from each internal surface in turn to follow a predefined light path 76. Thus, the relative field angles of the light incident on the first plate-like waveguide 64 at the first face 68 are preserved within the first plate-like waveguide 64 and the information required to regenerate the original image is preserved.

The transmission grating 74 also serves to radiated the image bearing light out of the first plate-like waveguide 64. The transmission grating 74 is a low efficiency grating which diffracts a small amount of light out of the first plate-like waveguide 64 on each interaction with incident image bearing light.

The second plate-like waveguide 66 is located with a first face 78 parallel with a second face 80 of the first plate-like waveguide 64 and is arranged to receive the image bearing light exiting the second face 80 of the first plate-like waveguide 64. The second face 80 is parallel to the first face 68 of the first plate-like waveguide 64. The first face 78 of the second plate-like waveguide 66 is located adjacent and close to the second face 80 of the first plate-like waveguide 64. The second plate-like waveguide 66 includes a coupling grating 82 located therein arranged substantially parallel to the first face 78 of the second plate-like waveguide 66 and the coupling grating 82 is operable to diffract each impinging ray of image bearing light received from the transmission grating 74 of the first plate-like waveguide 64 at an angle that is larger than the critical angle for the material from which the second plate-like waveguide 66 is made. Accordingly, received image bearing light will propagate inside the second plate-like waveguide 66 to follow the predefined light path 76. The image bearing light continues along the light path 76 to an exit grating 84 arranged within the second plate-like waveguide 66, which is arranged to diffract the received image bearing light out of the second plate-like waveguide 66 towards the observer 62.

The coupling grating 82 is arranged such that its diffractive power is rotated through 90 degrees to that of the diffractive power of the parallel transmission grating 74 to rotate incident image bearing light towards the exit grating 84.

The exit grating 84 is a low efficiency grating, such that as image bearing light propagates along the light path 76 within the second plate-like waveguide 66, each interaction with the exit grating 84 causes a small proportion of the image bearing light to be diffracted out of the second plate-like waveguide 66. Image bearing light which is not diffracted out of the second plate-like waveguide 66 continues to propagate within the second plate-like waveguide 66. Accordingly, a large number of parallel rays of image bearing light radiating from the second plate-like waveguide 66 through the exit grating 84 towards the observer 62, which originated at discrete points on the micro-display forming the image generating light source device.

It will be noted that the second plate-like waveguide 66 includes a first layer of material 86 and a second layer of material 88. These layers of material 86, 88 are formed from different materials such that they have different refractive indices to one another. As will be described in more detail below, the difference in refractive indices between the two layers of material 86, 88 results in a variance of the spatial periodicity of pupils of image bearing light exiting the second plate-like waveguide 66. This causes individual pupils of image bearing light radiating from the second plate-like waveguide 66 to overlap, thereby mitigating pupil banding perceived by the observer 62.

Typically, the layers 86, 88 can be formed from materials with sufficient different refractive indices, but sharing the same or similar coefficients of temperature expansion, for example one layer of material can be BK7 glass and the other layer of material can be LAK7 glass.

Figure 7:
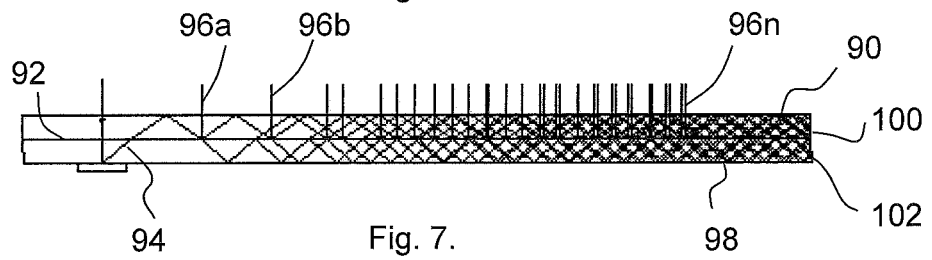
FIG. 7 illustrates, in elevation view, a waveguide according to the present invention and propagation of image bearing light through the waveguide.

Referring to FIG. 7, a second plate-like waveguide 90 includes an exit grating 92 arranged such that impinging image bearing light is split to either diffracted out of the second plate-like waveguide 90 as a pupil of image bearing light 96a to 96n for viewing by an observer, not illustrated, or to follow light pathway 94 such that the image bearing light passes through the exit grating 92 and is reflected by internal surface 98 of the second plate-like waveguide 90 so as to propagate further through the second plate-like waveguide 90 and hence impinge on the exit grating 92 again. The second plate-like waveguide is formed of two layers of material, a first layer of material 100 and a second layer of material 102, the layers of material having different refractive indices to one another. As the image bearing light passes through the transition between the first layer of material 100 and the second layer of material 102, refraction of the image bearing light occurs with changes the direction of the light pathway 94 of the image bearing light. This results in pupils of light exiting the second plate-like waveguide 90 at irregular spacings.

Figure 8:
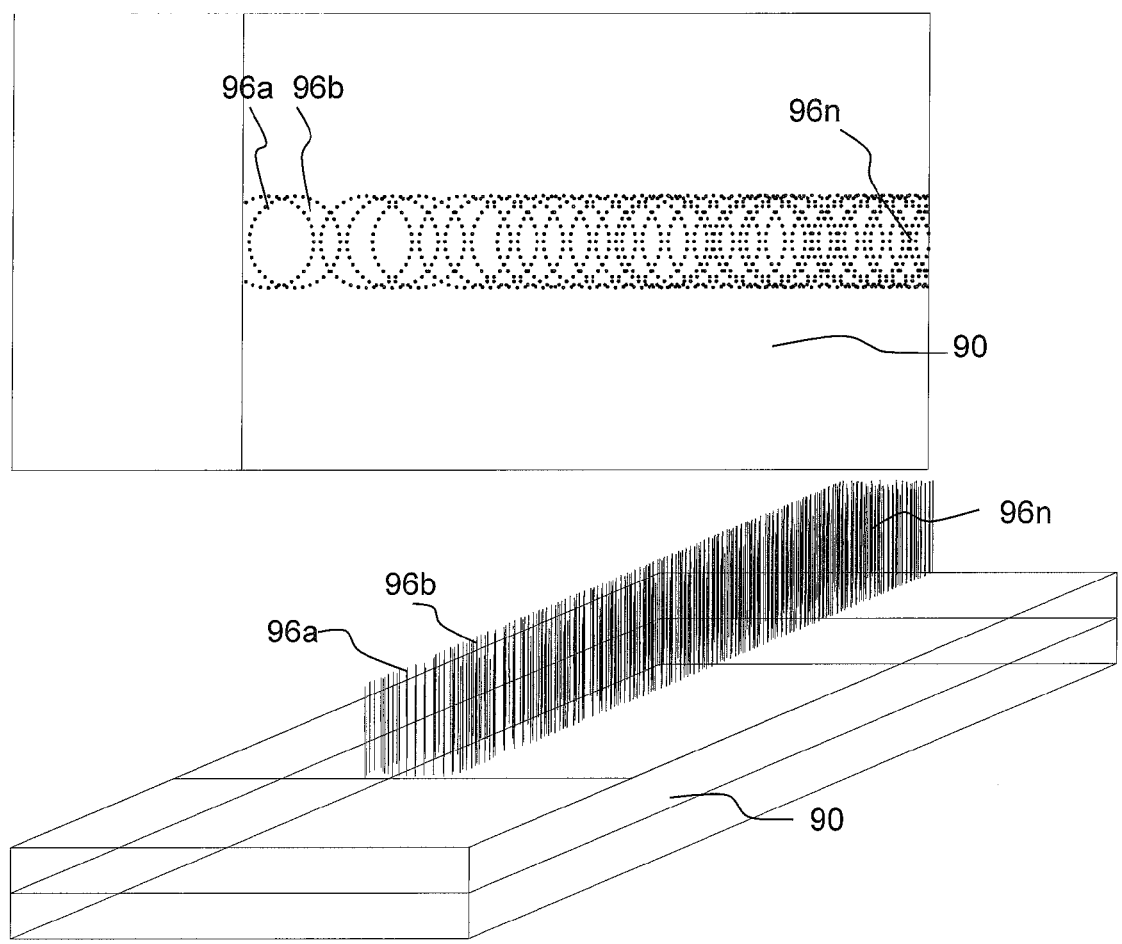
FIG. 8 illustrates, in both plan and perspective view, the waveguide of FIG. 7.

It will be noted that the individual pupils of image bearing light 96a to 96n exiting the second plate-like waveguide 90 as illustrated are the centres of the radiated pupils and are irregularly spaced. Referring to FIG. 8, wherein like references have been used to indicate similar integers to those described with reference to FIG. 7, the individual pupils of image bearing light 96a to 96n can be more clearly seen. Since the individual pupils of image bearing light 96a to 96n are irregularly spaced and overlap the pupils are mixed so as to diminish the individuality of each pupil of image bearing light 96a to 96n and thereby, as the eye of the observer moves across the second plate-like waveguide 90, the intensity of the image bearing light from each pupil of image bearing light 96a to 96n will appear to be less modulated than that of the prior art. This results in the mitigation of pupil banding that can be perceived by the observer.

Figure 9:
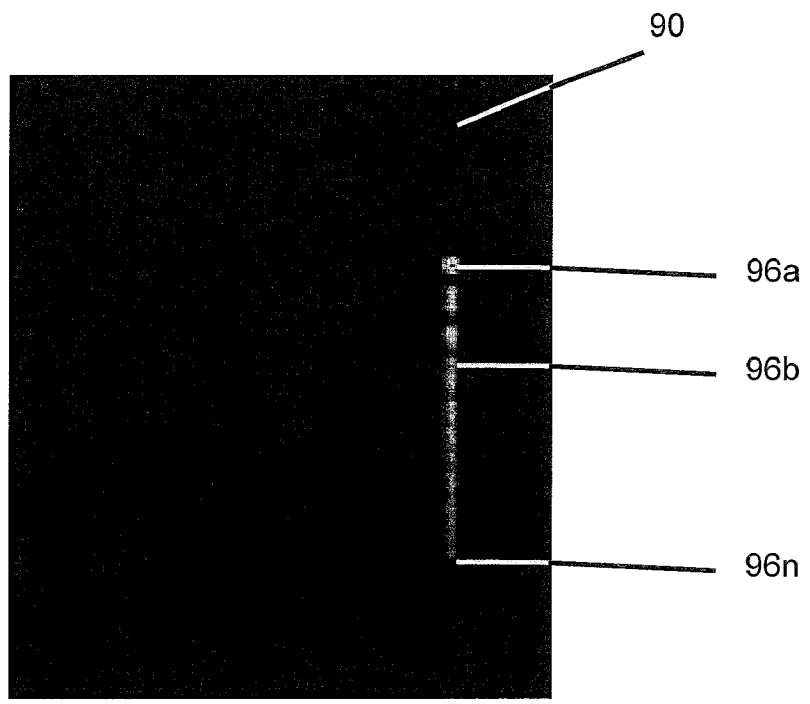
FIG. 9 illustrates, in both elevation and plan view, pupils of image bearing light exiting the waveguide of FIGS. 7 and 8.

Referring to FIG. 9, wherein like referenced have been used to indicate similar integers to those described with reference to FIGS. 7 and 8, the individual pupils of image bearing light 96a to 96n can be seen on the second plate-like waveguide 90 as viewed by an observer. Again, it will be seen that the individual pupils of image bearing light 96a to 96n are irregularly spaced thereby reducing regions of more intense illumination as the individual pupils of image bearing light 96a to 96n overlap or mix with one another.

Figure 10:
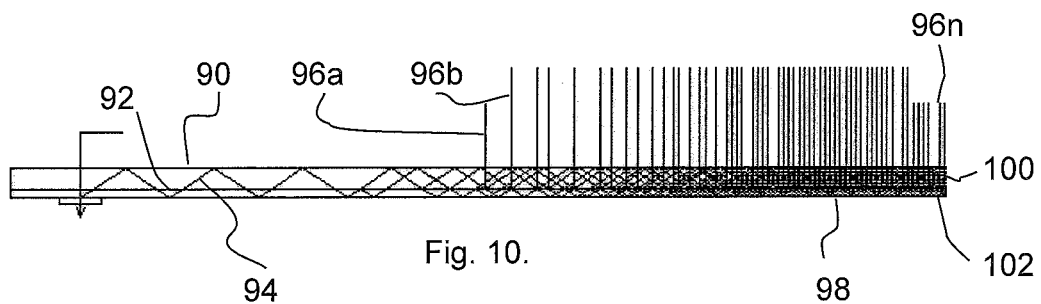
FIG. 10 illustrates, in elevation view, an alternative waveguide according to the present invention and propagation of image bearing light through the waveguide.
Figure 4:
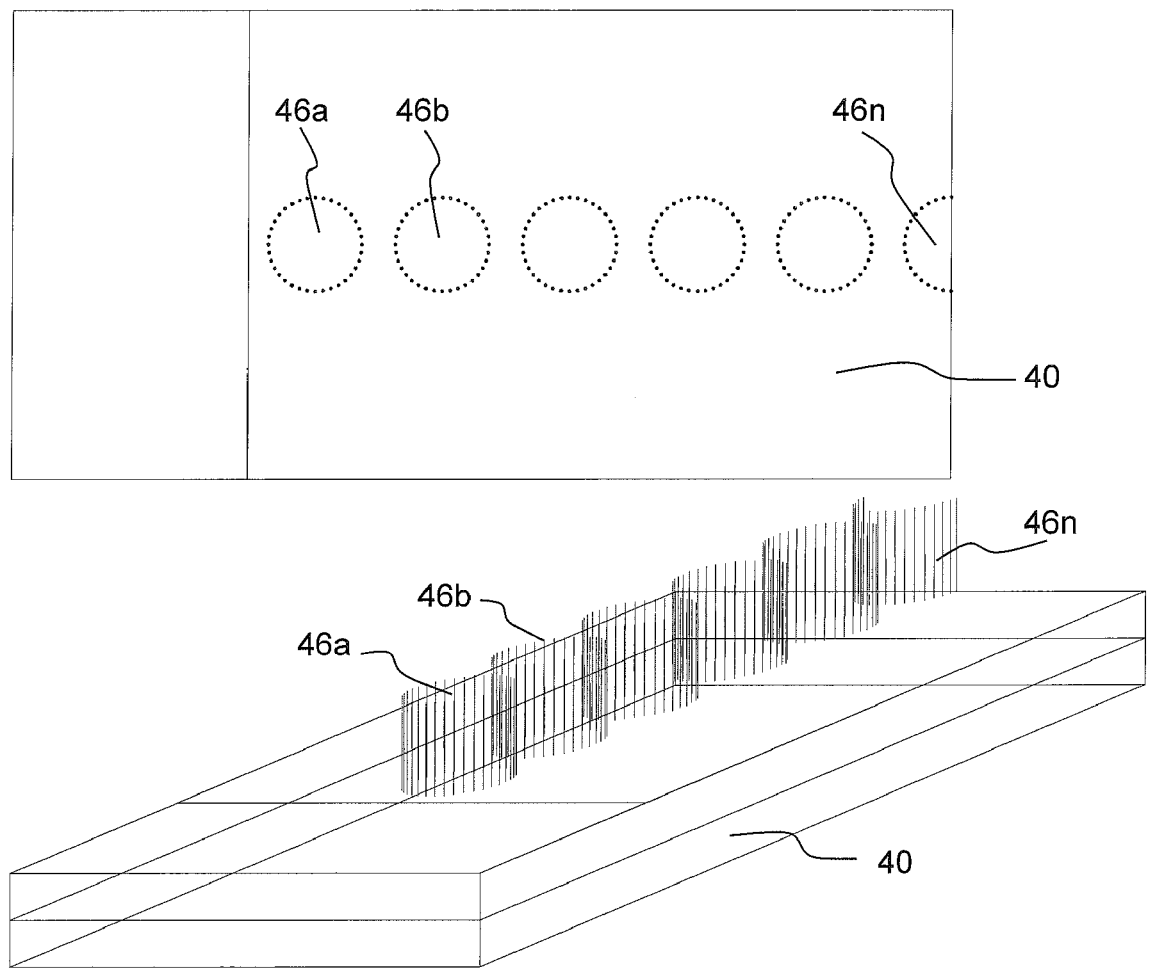
FIG. 4 illustrates, in both plan and perspective view, the prior art waveguide of FIG. 3.
Figure 5:
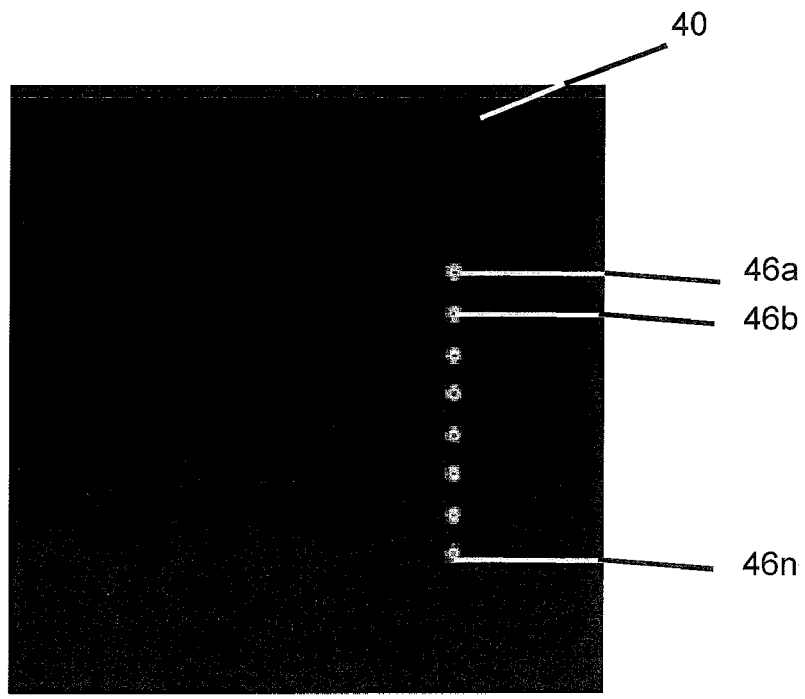
FIG. 5 illustrates, in both elevation and plan view, pupils of image bearing light exiting the waveguide of FIGS. 3 and 4.

Referring to FIG. 10, wherein like references have been used to indicate similar integers to those described with reference to FIG. 7, an alternative embodiment of the invention can use two layers of material 100, 102 both formed from the same material, but wherein one layer of material 100 is thicker than the other layer of material 102. It will be understood that the difference in thickness of the layers of material 100, 102, being a non-integer ratio, will lead to differences in path lengths for image bearing light split by the exit grating 84. This in turn will lead to a non-periodic output position of pupils of image bearing light from the second waveguide element 66 with affecting the angular distribution of the image bearing light pupils. This will result in pupil overlap or mixing and hence mitigation of pupil banding as perceived by the observer. Otherwise, this embodiment of the invention operates in a similar manner to that described with reference to FIGS. 6 to 9. An advantage of using two layers 100, 102 of the same material is an improvement of the thermal stability of the second plate-like waveguide 90. Typically, the layers of material 100, 102 can be formed from BK7 glass.

It will be understood that the integers of the embodiment described with reference to FIG. 7 and the integers of the embodiment described with reference to FIG. 10 can be combined to give layers 100, 102 of different thickness and different refractive indices.

It is also possible to optimise the beam splitting efficiency of the exit grating 84 for image bearing light within the second waveguide element 66 by modification of the grating design or inclusion of an additional layer adjacent to the exit grating 84 with the second waveguide element. Furthermore, one or more additional beam splitting elements can be provided within the second waveguide element to increase beam splitting efficiency.

It will be understood that more than two layers of material can be arranged adjacent to one another in the invention to improve thermal stability of the second plate-like waveguide 90. For example, a three layer structure can be provided in order to achieve mechanical symmetry to minimise thermal deformation when using materials with dissimilar thermal expansion coefficients.

It will be understood that the first waveguide element 64 can also be constructed in a similar manner to that described with reference to the second waveguide element 66 to provide similar overlap or mixing properties to that of the second waveguide element 66.

Referring again to FIG. 6, it will be understood that the exit grating 84 not only diffracts light towards the observer 62 but also diffracts light away from the observer 62. Preferably, a narrow band selective reflection coating, not shown, is provided on at least part of a second face of the second waveguide element 66 opposite to and parallely spaced from the first face 78 to reflect light that has passed through the exit grating 84 back to the exit grating 84 and observer 62 to increase display efficiency.

Preferably, the coupling grating 82 and the exit grating 84 can have substantially the same spatial frequency, thus cancelling any chromatic aberration introduced by the coupling grating 82. Advantageously, the transmission grating 74, the coupling grating 82 and exit grating 84 can have substantially the same spatial frequency to assist in creating a simple, low cost optical configuration.

It will be noted that the collimating lens arrangement is the only integer of the optical train that includes optical power and is arranged to create the image to be displayed, albeit with a small exit pupil. The collimating lens arrangement creates collimated image bearing light such that the angle of a ray of the image bearing light exiting the collimating lens arrangement corresponds to a unique position within the total field of view of the image to be displayed. This condition is maintained throughout the light path 76 of the image bearing light through the first and second waveguide elements 64 and 66 to maintain the image to be displayed.

The first waveguide element 64 and the second waveguide element 66 of the present invention have two purposes: the first is to expand the small exit pupil provided by the collimating lens arrangement in two orthogonal axes; and the second is to act as a combiner structure to present the image be displayed to an observer overlaid on an outside world scene 70. As each angle inputted into the first waveguide element 64 is maintained as being unique to a particular field position of the image to be displayed, in a continuous manner, then the image to be displayed at the second waveguide element 66 will be maintained.

This frees an optical designer from the usual constraints of design of head up, helmet or head mounted displays.

Although the first waveguide element 64 and the second waveguide element 66 have been shown as planar in the illustrated embodiment of the invention either the first waveguide element 64 and/or the second waveguide element 66, if desired, can be made curved.

It will be understood that an alternative embodiment of the invention could include first and second waveguide elements formed in a single piece of material, such material providing the correct optical properties for each waveguide element. In this case, the first and second waveguide elements can be arranged within the material either co-planar or parallel with respect to one another. Such an embodiment would provide easier alignment of the first and second waveguide elements.

Alternatively, the first waveguide element can be rod shaped and the second waveguide element can be plate-like shaped, the rod shaped waveguide element being arranged along one edge of the plate-like shaped waveguide element. The first waveguide element arranged to allow image bearing light to exit along the edge adjacent to the second waveguide element.

The transmission grating 74, coupling grating 82 and exit grating 84 can be formed by suitable holograms and/or semi-reflective surfaces. The transmission grating 74, coupling grating 82 and exit grating 84 can be either reflective or transmissive type gratings.

Additionally, the waveguide and/or projection display illustrated according to the invention can form part of a Head Up Display, of a Helmet Mounted Display and/or of a Head Mounted Display, particularly for aircraft usage.

The invention claimed is:

1. A projection display comprising a waveguide element into which image bearing light can be injected to propagate along the waveguide element by total internal reflection, the waveguide element including:
a first layer of material with a first predetermined refractive index and/or first predetermined thickness;
a second layer of material with a second predetermined refractive index and/or second predetermined thickness, at least one of the second predetermined refractive index and the first predetermined thickness being different from the second predetermined refractive index and the second predetermined thickness, respectively;

a grating element arranged on either the first or the second layer of material and arranged to provide beam splitting of image bearing light passing through the grating element and to direct image bearing light propagating along the waveguide element which impinges on the grating element such that the incidence angle of the directed light on the internal surfaces of the waveguide element is greater than the critical angle so that light is output from the waveguide element;

the first and second layers of material are arranged to abut one another such that the grating element is arranged between the first and the second layers of material; and wherein the first predetermined refractive index and second predetermined refractive index and/or the first predetermined and second predetermined thickness are arranged to vary the spatial periodicity of image bearing light radiated from the waveguide element.

2. A projection display, as claimed in claim 1, wherein a beam splitter element is also arranged to split impinging image bearing light and is arranged to direct such image bearing light within the waveguide element.

3. A projection display, as claimed in claim 1, wherein the first and second layers of material are formed from two different materials with different refractive indices.

4. A projection display, as claimed in claim 1, wherein the first and second layers of material are formed from the same material, one layer of material arranged to have a different thickness to the other layer of material.

5. A waveguide, as claimed in claim 1, wherein the first and second regions of material are arranged to have different refractive indices and/or different thickness by application of at least one of the following processes: ion injection or diffusion or implantation.

6. A projection display comprising:

a first waveguide element arranged to be light transmissive;

an image-providing light source device arranged to generate an image and to inject image bearing light into the first waveguide element;

a transmission grating associated with the first waveguide element arranged to direct the image bearing light internally along the first waveguide element and through which the image bearing light is outputted from the first waveguide element;

a second waveguide element arranged to be light transmissive and transparent that includes a coupling grating arranged to receive the image bearing light from the first waveguide element and to direct the image bearing light along the second waveguide element;

the second waveguide element further includes an exit grating arranged to diffract received image bearing light out of the second waveguide element towards an observer; and wherein the second waveguide element includes a first layer of material with a first predetermined refractive index and/or first predetermined thickness, a second layer of material with a second predetermined refractive index and/or second predetermined thickness, the exit grating is arranged on either the first or the second layer of material and arranged to direct at least some impinging image bearing light out of the second waveguide element and to provide at least some beam splitting of image bearing light passing through the exit grating, the first and second layers of material are arranged to abut one another such that the exit grating is arranged between the first and the second layers of material and wherein the first predetermined refractive index and second predetermined refractive index and/or first predetermined thickness and second predetermined thickness are arranged to vary the spatial periodicity of pupils of image bearing light radiated from the second waveguide element.

7. A projection display, as claimed in claim 6, wherein the first waveguide element includes a first layer of material with a first predetermined refractive index and/or first predetermined thickness, a second layer of material with a second predetermined refractive index and/or second predetermined thickness, the transmission grating is arranged on either the first or the second layer of material and arranged to direct at least some impinging image bearing light out of the first waveguide element and to provide at least some beam splitting of image bearing light passing through the transmission grating, the first and second layers of material are arranged to abut one another such that the transmission grating is arranged between the first and the second layers of material and wherein the first predetermined refractive index and second predetermined refractive index and/or first predetermined thickness and second predetermined thickness are arranged to vary the spatial periodicity of pupils of image bearing light radiated from the first waveguide element.

8. A projection display, as claimed in claim 6, wherein a collimating lens arrangement is arranged between the image-providing light source device and the first waveguide element and the collimating lens arrangement is arranged to collimate image bearing light generated by the image-providing light source.

9. A projection display, as claimed in claim 6, wherein the transmission grating is arranged such that incident inputted image bearing light is diffracted therefrom with the incidence angle of the diffracted light at internal surfaces of the first waveguide element arranged to be greater that the critical angle for the material from which the first waveguide element is made.

10. A projection display, as claimed in claim 6, wherein the transmission grating is a low efficiency grating.

11. A projection display, as claimed in claim 6, wherein the coupling grating is arranged such that incident image bearing light is diffracted therefrom with the incident angle of the diffracted light at internal surfaces of the second waveguide element arranged to be greater than the critical angle for the material from which the second waveguide element is made.

12. A projection display, as claimed in claim 6, wherein the diffractive power of the coupling grating is rotated through 90° with respect to the diffractive power of the transmission grating.

13. A projection display, as claimed in claim 6, wherein the second waveguide element includes a narrow band selective reflection coating provided on a surface of the second waveguide element parallely spaced from the exit grating, which reflective coating is arranged to reflect light passing through the exit grating back towards the narrow band selective reflection coating to the exit grating.

14. A projection display, as claimed in claim 6, wherein the first waveguide element is curved.

15. A projection display, as claimed in claim 6, wherein the second waveguide element is curved.

16. A projection display, as claimed in claim 6, wherein the injection of image bearing light is via reflective or transmissive or refractive means.

17. A projection display, as claimed in claim 6, wherein the first waveguide element is plate-like, the second waveguide element is plate-like and the first and second waveguide elements are arranged substantially parallel to one another.

18. A projection display, as claimed in claim 6, wherein the first waveguide element and the second waveguide element are arranged substantially in the same plane.

19. A projection display, as claimed in claim 18, wherein the first waveguide element and the second waveguide element are formed within a single piece of material.

20. A Head Up Display, or Helmet Mounted Display, or Head Mounted Display including a waveguide element as claimed in claim 1.

21. A Head Up Display, or Helmet Mounted Display, or Head Mounted Display including a projection display as claimed in claim 6.

* * * * *